(12) United States Patent  
Lefebvre

(10) Patent No.: US 6,641,294 B2
(45) Date of Patent: Nov. 4, 2003

(54) VEHICLE LIGHTING ASSEMBLY WITH STEPPED DIMMING

(75) Inventor: Phillip Lefebvre, Waukesha, WI (US)

(73) Assignee: EMTEQ, Inc., Muskego, WI (US)

( * ) Notice: Subject to any disclaimer, the term of this patent is extended or adjusted under 35 U.S.C. 154(b) by 0 days.

(21) Appl. No.: 10/103,917

(22) Filed: Mar. 22, 2002

(65) Prior Publication Data

US 2003/0179585 A1 Sep. 25, 2003

(51) Int. Cl.[7] .................................................. F21V 29/00
(52) U.S. Cl. .................... 362/544; 362/249; 362/488; 362/545; 315/185 R; 315/193
(58) Field of Search ............................ 362/543, 544, 362/545, 249, 488, 489, 471, 219, 225, 190, 191, 226, 238, 350, 251; 315/185 R, 192, 193

(56) References Cited

U.S. PATENT DOCUMENTS 4,298,869 A * 11/1981 Okuno ........................ 345/82
4,868,719 A * 9/1989 Kouchi et al. ............. 362/545
5,490,049 A 2/1996 Montalan et al.
6,016,035 A 1/2000 Eberspacher et al.
6,158,882 A 12/2000 Bischoff, Jr.

* cited by examiner

Primary Examiner—Sandra O'Shea
Assistant Examiner—John Anthony Ward
(74) Attorney, Agent, or Firm—George E. Haas; Quarles & Brady LLP

(57) ABSTRACT

A lighting assembly for illuminating a vehicle interior has an elongated housing which supports a printed circuit board that has an electrically conductive pattern. A plurality of electrical terminals are connected to the electrically conductive pattern for coupling the lighting assembly to a source of electricity. A plurality of light emitting diodes are arranged in a plurality of rows on the printed circuit board. The light emitting diodes in each row being electrically connected in series between two of the electrical terminals. The light emitting diodes are so connected that application of electricity to selected ones of the electrical terminals causes illumination of different combinations of the rows of light emitting diodes which results in the lighting assembly producing different light intensity levels in the vehicle interior.

23 Claims, 2 Drawing Sheets

VEHICLE LIGHTING ASSEMBLY WITH STEPPED DIMMING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to semiconductor lighting systems and more particularly to interior lighting of a vehicle using dimmable assemblies of light emitting diodes.

2. Description of the Related Art

The interior cabins of vehicles, such as automobiles, trains and especially aircraft, currently are illuminated by fluorescent or incandescent lighting systems. The disadvantages of those types of systems include short life of the light emitter or bulb, significant weight, generation of radio frequency interference, heat generation, maintenance costs and fragility.

One solution used to counter the problems identified above has been to use a light emitting diode (LED), either singularly or in groups. U.S. Pat. No. 6,158,882 describes a vehicle lighting system which employs a plurality of LED's mounted in a linear array to form a lighting strip. Such a strip can be used to wash a wall or ceiling of the vehicle with light. This device is particularly useful to illuminate the cabin of an aircraft. The DC voltage required to illuminate the LED's is furnished from a power supply hat includes a mechanism for varying the DC voltage to control the intensity of the illumination provided by the lighting strip. Specifically a variable voltage regulator is provided in the system described in the aforementioned patent. This enables the illumination of the vehicle's interior to be adjusted depending upon the outside light level. For example, in daylight the LED lighting strip typically is driven at a voltage level which provides maximum illumination. At nighttime, that maximum illumination level may interfere with the ability of occupants to see through the vehicle windows. Therefore, a lower interior illumination level is preferred at night.

Electromagnetic interference (EMI), especially in the radio frequency spectrum (RFI) is especially troublesome in aircraft, as such can interfere with navigation and communication systems. Thus variable power supplies often require special filtering and insulating elements to avoid or minimize EMI and RFI. That in turn adds weight and consumes space, both of which are a premium in an aircraft.

Weight always is a major consideration in the construction of aircraft and manufacturers go to great lengths to reduce weight of components where ever possible. Thus it is desirable to reduce the weight of circuits for dimming aircraft cabin lighting.

SUMMARY OF THE INVENTION

A lighting assembly for illuminating a vehicle interior has an elongated housing adapted to be mounted in the vehicle interior and has a plurality of electrical terminals for connection to a source of electricity.

A plurality of light emitters, preferably light emitting diodes, is supported by the housing and arranged in a plurality of rows. The light emitters in each row are electrically connected together and to ones of the plurality of electrical terminals wherein application of electricity to selected ones of the plurality of electrical terminals causes illumination of different combinations of the plurality of rows of light emitters. Such selective application of electricity results in the lighting assembly producing different light intensity levels in the vehicle interior.

In the preferred embodiment in which the light emitters are light emitting diodes, each of the rows is divided into groups of light emitting diodes electrically connected in series with the groups for a given row electrically connected in parallel. When the lighting assembly is powered by alternating current, a first set of the groups of light emitting diodes in a given row are connected in an inverse parallel manner to a second set of groups in the given row. Thus each set will illuminate during opposite half-cycles of the alternating current. In another embodiment for use with alternating current, a full-wave rectifier is provided to power the light emitting diodes and the full-wave rectifier may employ some of the light emitting diodes to rectify the alternating current.

In one version of the present lighting system there are first, second and third rows of light emitters with the first and third rows electrically connected in parallel. A switching device is attached to the rows of the lighting assembly. The switching device has a first state in which electricity is applied to only the second row of light emitters, a second state in which electricity is applied to only the first and third rows of light emitters, and a third state in which electricity is applied to every row of light emitters.

DETAILED DESCRIPTION OF THE INVENTION

Figure 1:
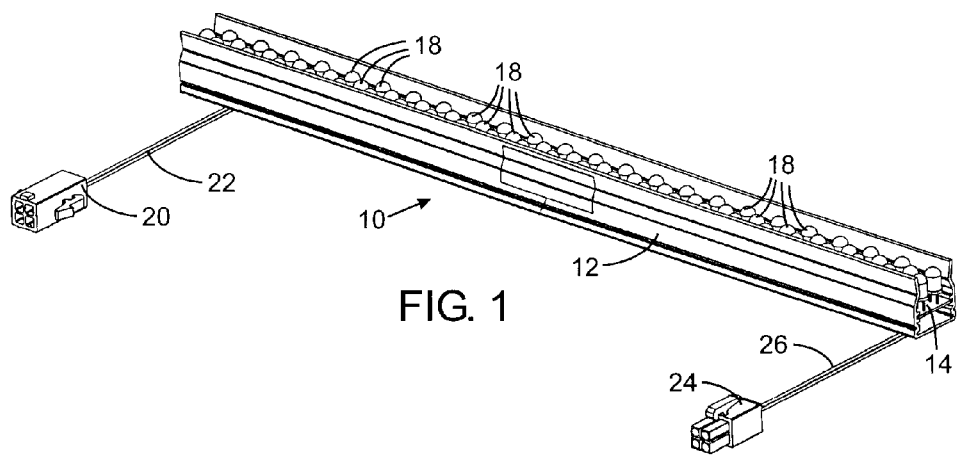
FIG. 1 is an isometric view of an LED lighting strip according to the invention.
Figure 2:
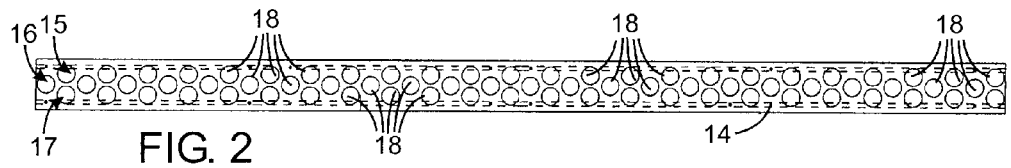
FIG. 2 is a top view of a printed circuit board of the LED lighting strip.

With initial reference to FIG. 1, a strip-type lighting assembly 10 includes a housing 12 in the form of a U-shaped channel which supports longitudinal edges of a printed circuit board 14. The circuit board 14 has three longitudinally extending rows 15, 16 and 17 of light emitting diodes (LED's) 18. In order to provide a relatively compact lighting assembly 10, the LED's 18 in the outer two rows 15 and 17 are located side by side along the length of the lighting assembly, as seen in FIG. 2. The adjacent LED's in each of the outer rows 15 and 17 are spaced apart so that an LED of the second, or middle row 16 nest longitudinally between those adjacent LED's in the outer rows 15 and 17. Thus, the printed circuit board has only two LED's abreast of each other, making the lighting assembly 10 relatively thin.

A first electrical connector 20 is coupled by a cable 22 to a conductive pattern at one end of the circuit board 14 and a second electrical connector 24 is coupled by another electrical cable 26 to the conductive pattern at the other end of the printed circuit board. The two connectors 20 and 24 are of opposite gender so that a plurality of lighting assemblies 10 can be connected together in a daisy chain manner. That is, the first connector 20 of another lighting assembly 10 can be connected to the second connector 24 of the assembly shown in FIG. 1. Thus a plurality of lighting assemblies 10 may be wired end to end along the interior of an aircraft cabin, for example.

Figure 3:
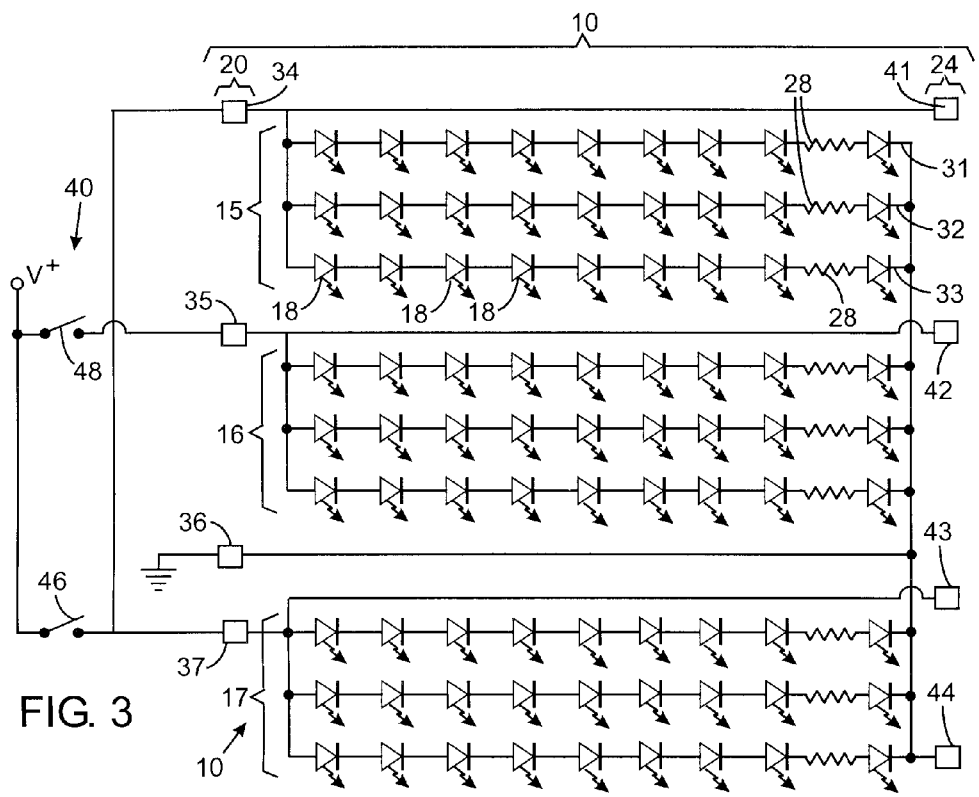
FIG. 3 is a schematic diagram of the LED lighting strip connected by switches to a source of direct current.

With reference to the electrical schematic diagram of FIG. 3, the LED's in each row 15–17 are connected to the conductive pattern on the printed circuit board 14 wherein each row forms a separate circuit branch so that each LED row is individually controllable. The LED's 18 in each row are further divided into three groups, each us forming a separate sub-branch of the respective row circuit branch, for example sub-branches 31, 32 and 33 of the first row 15. Each sub-branch 31–33 comprises an equal number of LED's 18 connected in series with a current limiting resistor 28. The sub-branches 31–33 for the first row 15 are connected in parallel between a first terminal 34 of the first connector 20 and a ground terminal 36 of that connector. The LED's in the second, or middle, row 16 are grouped into sub-branches having a similar electrical configuration and those groups, or sub-branches, are connected in parallel between a second terminal 35 of the first connector 20 and the ground terminal 36. Similarly, the sub-branches of the third row 17 are connected in parallel between a third terminal 37 of the first connector 20 and the ground terminal 36.

The second connector 24 has four terminals 41, 42, 43 and 44 which are directly connected to the four terminals 34, 35, 36 and 37, respectively, of the first connector 20. Therefore, when a plurality of light assemblies 10 are connected in a daisy chain manner, each light assembly is connected in parallel to the source of DC voltage, as will be described.

The lighting assembly 10 is illustrated, in FIG. 3, connected to a control circuit 40 which governs which of the rows 15–17 of LED's are illuminated at any given time. Although the control circuit 40 is shown connected to the first connector 20, it alternatively could be connected to the second connector 24. Terminals 34 and 37 for the outer two rows 15 and 17 of LED's 18 are connected together to one contact of a first switch 46 that has another contact connected to a source of positive voltage V+. A second electrical switch 48 couples the source of positive voltage V+ to the second terminal 35 of the second row 16 of LED's within lighting assembly 10. The ground terminal 36 is connected to the ground connection for the vehicle or for the power supply that furnishes the positive voltage V+.

This interconnection of the rows of LED's enables the lighting assembly 10 to produce three different light intensities for illuminating the interior of a vehicle. For the maximum illumination, both switches 46 and 48 are closed to apply electric current to all three rows 15–17 so that all of the LED's are illuminated. A second intensity level of 66% of the maximum illumination intensity can be achieved by closing only the first electrical switch 46 and opening the second electrical switch 48. In this case, electrical current is applied to only the outer first and third rows 15 and 17, so that the LED's in only two rows are energized. A third still dimmer illumination level can be accomplished by closing only the second switch 48 and opening the first switch 46, which applies electric current to only the middle second row 16 of LED's. In this latter mode, only one of the three rows of LED's 18 is active thus producing illumination at 33% of the maximum illumination intensity. Obviously, by opening both switches 46 and 48, the entire light assembly 10 can be turned off.

A greater number of illumination levels can be made available by providing addition rows of light emitting diodes in the lighting assembly. In that case, the control circuit 40 would have more switches to enable selection of a larger number of combinations of active and inactive rows. For example, adding a fourth row to the lighting assembly provides four different illumination levels.

The lighting assembly 10 can have substantially the same number of LED's in order to produce the same maximum light level as previous LED strips which were controlled by a dimming power supply. Because dimming is accomplished by using only a pair of switches, the weight and space of the control circuit 40 is considerably less than that of prior dimmable regulated power supplies. Thus, there is a significant advantage of the present lighting assembly in vehicles, such as aircraft, where weight and space are a significant concern.

Figure 4:
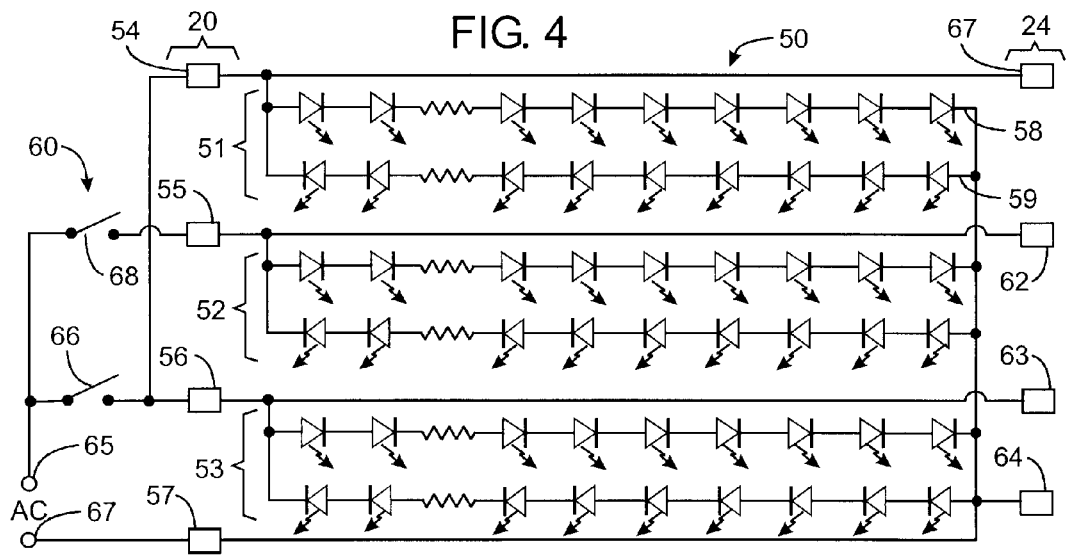
FIG. 4 is a schematic diagram of an alternative embodiment of the LED strip connected by switches to a source of alternating current.

There is a current trend in aircraft electrical systems away from the use of direct current toward alternating current. For example, more recently developed aircraft utilize 400 Hz alternating current for cabin lighting. FIG. 4 illustrates the connection of the rows of LED's in a lighting assembly 50 which can be utilized in such alternating current systems. The LED's in each row 51, 52 and 53 are grouped into an even number of sub-branches, such as the pair of sub-branches 58 and 59 for the first row 51. The sub-branches, or groups, 58 and 59 are connected in parallel between a first terminal 54 and a common terminal 57. Half of the sub-branches in the first row have LED's poled in one direction between terminals 54 and 57, and the LED's in the other half of the sub-branches in the first row 51 are poled in the opposite direction. In other words half of the sub-branches are poled in an inverse parallel manner to the other half of the sub-branches in a given row. Thus, when alternating current is applied across terminals 54 and 57, half of the LED's in the first row 51 conduct, and thus illuminate, during each half cycle of the alternating current. The same is true with respect to the second and third rows 52 and 53. The sub-branches of the second row 52 are connected in parallel between a second electrical terminal 55 and the common terminal 57, while the sub-branches for the third row 53 are connected in parallel between the third electrical terminal 56 and the common terminal 57.

The second connector 24 of a lighting assembly has terminals 61, 62, 63 and 64 which are respectively directly connected to terminals 54, 55, 56 and 57 of the first connector 20.

This lighting assembly 50 is coupled to a control circuit 60 which is similar to the control circuit 40 in FIG. 3. Specifically, the first and third terminals 54 and 56 for the outer, first and third rows 51 and 53 of LED's are connected to one contact of a first electrical switch 66 which has another contact connected to a first power terminal 65. The second terminal 55 for the second row of L,ED's 52 is coupled by a second electrical switch 68 to the first power terminal 65. The common terminal 57 for the light assembly 50 is connected to a second power terminal 67.

In operation alternating current from a source is applied across the first and second power terminals 65 and 67. By closing both electrical switches 66 and 68, alternating current is applied to all three rows 51–53 and the lighting assembly 50 is illuminated to its full intensity. Because of the relatively high frequency (e.g. 400 Hz) employed in aircraft lighting systems, occupants of the cabin will not perceive any flicker in the light from the LED's produced by the alternating current, even though only half of the LED's are illuminated at any given instant because of the alternating current. The reduced illumination can be compensated for by increasing the number of LED's per inch in the lighting assembly or utilizing LED's with greater light output.

To dim the lighting assembly 50, the first switch 66 is closed to activate only the first and third rows 51 and 53 of LED's, thus producing illumination at a level equal to 66% of the full illumination level. A lower light level, i.e. 33% of full illumination, only the second electrical switch 68 is closed which applied electricity to only the LED's in the second row 52.

Figure 5:
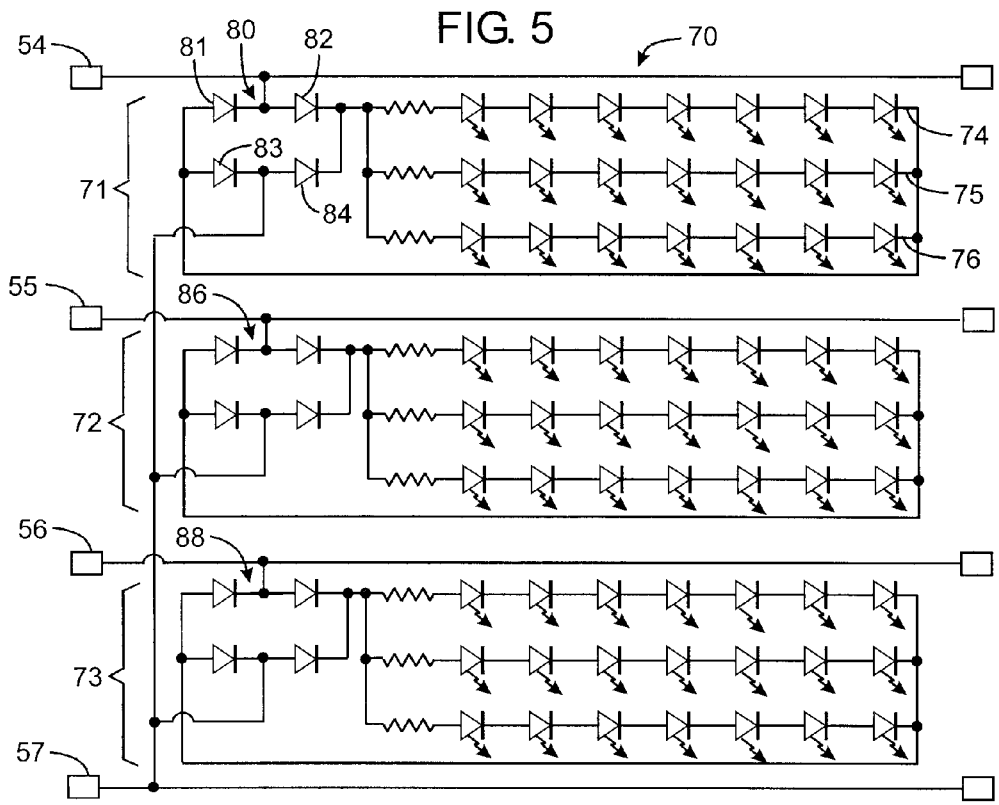
FIG. 5 is a schematic diagram of another embodiment of the LED strip for use with alternating current.

FIG. 5 illustrates another lighting assembly 70 for use with an alternating current source. This lighting assembly has terminals 54, 55, 56 and 57 which correspond to the like numbered terminals in FIG. 4 for connection to the control circuit 60. However, the lighting assembly 70 incorporates full-wave rectifier bridges which enable all the LED's in an activated row to illuminate during both half cycles of the alternating current. The lighting assembly comprises three LED rows 71, 72 and 73. Each row comprises a plurality of sub-branches, such as sub-branches 74, 75 and 76 for the first row 71. The first row 71 has a full-wave bridge rectifier 80 formed by diodes 81, 82, 83 and 84 and having a pair of nodes connected to the first terminal 54 and the common terminal 57. The bridge 80 has another pair of nodes across which the three sub-branches 74–76 are connected and parallel. The other two rows 72 and 73 have similar circuit configurations with additional full-wave bridge rectifiers 86 and 88. Alternatively, some of the light emitting diodes of a row may be utilized in the bridge rectifiers.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. For examples although light emitting diodes are used in the preferred embodiment, other types of light emitters could be used. Accordingly, the scope of invention should be determined from the following claims and not limited by the above disclosure.

What is claimed is:

1. A lighting assembly for illuminating a vehicle interior, the lighting assembly comprising:
    an elongated housing adapted to be mounted in the vehicle interior;
    a plurality of electrical terminals for connection to a source of electricity;
    a plurality of light emitters supported by the housing and arranged in a plurality of rows, the light emitters in each row are electrically connected between that same pair of the plurality of electrical terminals; and
    a control circuit which selectively applies electricity to selected ones of the plurality of electrical terminals thereby illuminating different combinations of the plurality of rows of light emitters which results in the lighting assembly producing different light intensity levels in the vehicle interior.

2. The lighting assembly as recited in claim 1 wherein the plurality of light emitters comprises light emitting diodes.

3. The lighting assembly as recited in claim 2 further comprising a full-wave rectifier connected to at least one of the plurality of rows of light emitters.

4. The lighting assembly as recited in claim 1 further comprising a common electrical terminal; and wherein each of the plurality of rows of light emitters is connected to the common electrical terminal and to one of the plurality of electrical terminals.

5. The lighting assembly as recited in claim 1 wherein the light emitters in each of the plurality of rows are connected in series between two of the plurality of electrical terminals.

6. The lighting assembly as recited in claim 1 wherein the light emitters in each of the plurality of rows are divided into groups of light emitters electrically connected in series with the groups for a given row electrically connected in parallel.

7. The lighting assembly as recited in claim 6 wherein the plurality of light emitters comprises light emitting diodes, and a first set of the groups of light emitters in a given row are electrically connected in an inverse parallel manner to a second set of groups in the given row.

8. The lighting assembly as recited in claim 1 wherein there are first, second and third rows of light emitters with the first and third rows electrically connected in parallel; and the control circuit having a first state in which electricity is applied to only the second row of light emitters, a second state in which electricity is applied to only the first and third rows of light emitters, and a third state in which electricity is applied to every row of light emitters.

9. A lighting assembly for illuminating a vehicle interior, the lighting assembly comprising:
    a printed circuit board having a first end and a second end with an electrically conductive pattern extending between the first end and the second end;
    a first plurality of electrical terminals connected to the electrically conductive pattern to couple the lighting assembly to a source of electricity; and
    a plurality of light emitting diodes arranged in a plurality of rows on the printed circuit board, the light emitting diodes in each row being electrically connected in series between two of the plurality of electrical terminals, wherein application of electricity to selected ones of the plurality of electrical terminals causes illumination of different combinations of the plurality of rows of light emitting diodes which results in the lighting assembly producing different light intensity levels in the vehicle interior.

10. The lighting assembly as recited in claim 9 wherein the first plurality of electrical terminals are connected to the electrically conductive pattern adjacent the first end of the printed circuit board; and further comprising a second plurality of electrical terminals located adjacent the second end of the printed circuit board and being connected to the first plurality of electrical terminals.

11. The lighting assembly as recited in claim 9 wherein the light emitting diodes in each of the plurality of rows are divided into groups of light emitting diodes electrically connected in series with the groups for a given row electrically connected in parallel.

12. The lighting assembly as recited in claim 11 wherein the plurality of light emitting diodes comprises light emitting diodes, and a first set of the groups of light emitting diodes in a given row are electrically connected in an inverse parallel manner to a second set of groups in the given row.

13. The lighting assembly as recited in claim 9 wherein there are first, second and third rows of light emitting diodes with the first and third rows electrically connected in parallel; and further comprising a switch assembly having a first state in which electricity is applied to only the second row of light emitting diodes, a second state in which electricity is applied to only the first and third rows of light emitting diodes, and a third state in which electricity is applied to every row of light emitting diodes.

14. The lighting assembly as recited in claim 9 further comprising a full-wave rectifier connected to at least one of the plurality of rows of light emitting diodes.

15. The lighting assembly as recited in claim 9 further comprising a full-wave rectifier formed by some of the light emitting diodes.

16. A lighting assembly for illuminating a vehicle interior, the lighting assembly comprising:

- an elongated housing adapted to be mounted in the vehicle interior;
- a printed circuit board supported by the housing and having a first end and a second end with an electrically conductive pattern extending between the first end and the second end;
- a first plurality of electrical terminals connected to the electrically conductive pattern to couple the lighting assembly to a source of electricity; and
- a plurality of light emitting diodes arranged in a plurality of rows on the printed circuit board, each row being divided into groups of light emitting diodes electrically connected in series with the groups in a given row electrically connected in parallel between two of the plurality of electrical terminals, wherein application of electricity to selected ones of the plurality of electrical terminals causes illumination of different combinations of the plurality of rows of light emitting diodes which results in the lighting assembly producing different light intensity levels in the vehicle interior.

17. The lighting assembly as recited in claim 16 wherein a first set of the groups of light emitting diodes in a given row being electrically connected in an inverse parallel manner to a second set of groups in the given row.

18. The lighting assembly as recited in claim 16 wherein there are first, second and third rows of light emitting diodes with the first and third rows electrically connected in parallel; and further comprising a control circuit having a first state in which electricity is applied to only the second row of light emitting diodes, a second state in which electricity is applied to only the first and third rows of light emitting diodes, and a third state in which electricity is applied to every row of light emitting diodes.

19. The lighting assembly as recited in claim 16 further comprising a full-wave rectifier connected to at least one of the plurality of rows of light emitting diodes.

20. The lighting assembly as recited in claim 9 further comprising a full-wave rectifier formed by some of the light emitting diodes.

21. The lighting assembly as recited in claim 16 wherein the first plurality of electrical terminals comprise a first electrical connector which is connected to the electrically conductive pattern adjacent the first end of the printed circuit board; and further comprising a second electrical connector having a second plurality of electrical terminals connected to the electrically conductive pattern adjacent the second end of the printed circuit board and to the first plurality of electrical terminals.

22. The lighting assembly as recited in claim 9 further comprising a control circuit which selectively applies electricity to selected ones of the plurality of electrical terminals thereby illuminating different combinations of the plurality of rows of light emitters which results in the lighting assembly producing different light intensity levels in the vehicle interior.

23. The lighting assembly as recited in claim 16 further comprising a control circuit which selectively applies electricity to selected ones of the plurality of electrical terminals thereby illuminating different combinations of the plurality of rows of light emitters which results in the lighting assembly producing different light intensity levels in the vehicle interior.

* * * * *